Figure 2:
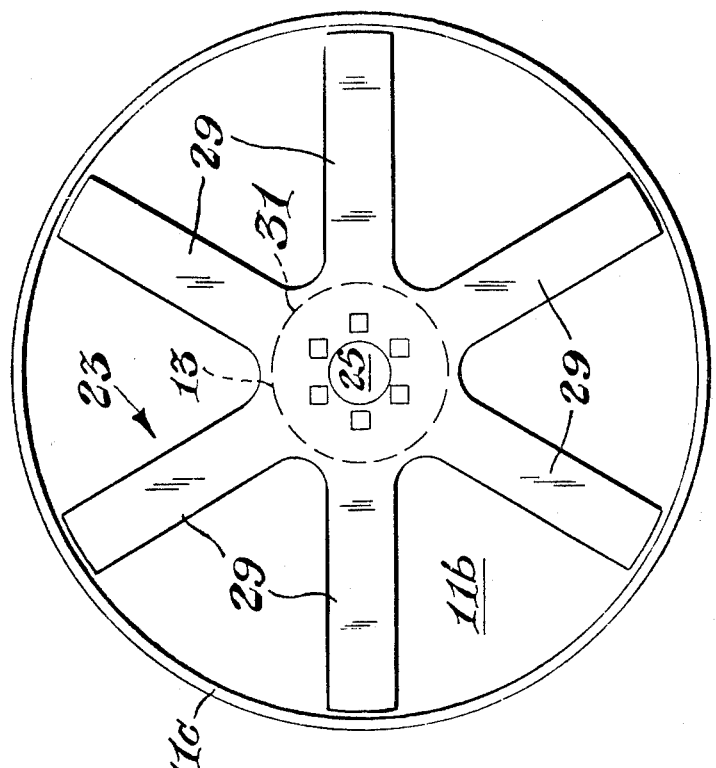

United States Patent [19]

Chisholm et al.

[11] 4,050,874
[45] Sept. 27, 1977

[54] CENTRIFUGAL EXTRUSION APPARATUS WHICH HEAT PLASTIFIES MATERIAL BY MECHANICAL SHEARING ACTION

[75] Inventors: Douglas S. Chisholm, Kent, Conn.; David H. Dawson, Green River, Wyo.

[73] Assignee: The Dow Chemical Company, Midland, Mich.

[21] Appl. No.: 661,195

[22] Filed: Feb. 25, 1976

Related U.S. Application Data

[62] Division of Ser. No. 536,493, Dec. 26, 1974, abandoned.

[51] Int. Cl.² ............................................. B29F 3/06
[52] U.S. Cl. .......................... 425/382 R; 264/176 R; 425/8; 425/464
[58] Field of Search ............... 264/176 R, 8, 25; 65/8; 425/381.2, 382, 463, 464, 202, 297, 313, 314, 197, 8, 9, 5

[56] References Cited

U.S. PATENT DOCUMENTS

| 3,015,128 | 1/1962 | Somerville, Jr. | 425/5 |
| 3,293,695 | 12/1966 | Baymiller et al. | 425/8 |
| 3,597,176 | 8/1971 | Plumat | 425/455 X |
| 3,877,918 | 4/1975 | Cerbo | 425/8 X |
| 3,912,799 | 10/1975 | Chisholm | 425/8 X |

FOREIGN PATENT DOCUMENTS 6,911,562  2/1971  Netherlands ........................ 425/8

Primary Examiner—Francis S. Husar
Assistant Examiner—Mark Rosenbaum
Attorney, Agent, or Firm—R. B. Ingraham

[57] ABSTRACT

A centrifugal extruder is provided with a friction generating element within a hollow rotor of the extruder. The material to be extruded is heated by shear generated by differential rotation between the extruder rotor and a shear generating element. Heat plastification is obtained adjacent the periphery of the rotor and a very short heat history is added to material treated in the apparatus.

6 Claims, 2 Drawing Figures

U.S. Patent  Sept. 27, 1977  4,050,874

CENTRIFUGAL EXTRUSION APPARATUS WHICH HEAT PLASTIFIES MATERIAL BY MECHANICAL SHEARING ACTION

CROSS-REFERENCE TO RELATED APPLICATION

This is a division, of application Ser. No. 536,493 Filed Dec. 26, 1974, now abandoned.

Extrusion of a variety of heat plastifiable material is well known. One particularly desirable form of extruder for some purposes is a centrifugal extruder such as is shown in U.S. Pat. No. 3,358,323 and U.s. Pat. No. 3,697,211. Such extruders are generally heated by induction heating of the metal or rotor which in turn provides the desired heat to the polymer or other heat plastifiable material to be extruded. In many instances, it is desired to extrude a material with as little heat history as possible, that is, the heat plastifiable material should be raised to the extrusion temperature and extrusion accomplished and the extrude cooled in a minimal period of time. One variety of thermoplastic polymer which is heat sensitive is the extrudable vinylidene chloride polymers. Such polymers often exhibit a sharp transition from a more or less solid state to a very fluid state. However, extrusion, particularly in screw or worm extruders, of vinylidene chloride polymers or other polymers which are heat sensitive, is oftentimes difficult to recover scrap material in usable condition because of additional degradation which occurs during the recovery or salvage process. Oftentimes it is desirable to convert a heat sensitive polymer from a light and bulky condition such as is obtained when a latex is coagulated to form a granular material prior to use in a screw or worm extruder. It is also desirable to densify such material into solid pellets. Generally, centrifugal extruders can accomplish melting, extrusion and cooling of the extrude much more rapidy than can worm extruders. However, melting is accomplished in a centrifugal extruder over a relatively large portion of the rotor, thus requiring the melt to be carried by centrifugal force to the periphery of the rotor where it is discharged through the extrusion orifices.

It would be desirable if there were available an improved centrifugal extrusion apparatus which would permit the extrusion of heat sensitive materials with minimal exposure and maintain polymer for only a minimal length of time at an extrusion temperature.

It would be desirable if such a centrifugal extruder would be of simple mechanical design.

It would also be desirable if such an extruder could be used with a wide variety of materials.

These features and other advantages are achieved in a centrifugal extruder, the centrifugal extruder comprising a generally hollow discoidal rotor, the hollow discoidal rotor defining a material receiving cavity, a plurality of peripherally disposed extrusion openings, the extrusion openings being in full communication with the material receiving cavity, the material receiving cavity having a generally double tapered cross-sectional configuration when the cross-section is taken in a plane containing the axis of rotation, the cavity having a maximum dimension adjacent the axis of rotation in a direction normal to the plane of rotation of the rotor and a minimum dimension in a direction normal to the plane of rotation of the rotor at a location remote from the axis of rotation, a shear means disposed within the material receiving cavity, the shear means being a generally planar shearing element adapted to rotate coaxially relative to the housing and having peripheral portions which approximate the diameter of the material receiving cavity, the shearing element being in spaced relationship to a surface of the housing defining the cavity and the extrusion orifices, means to rotate the rotor and means to rotate the shearing element in a like direction, the rotor and the shearing element being also rotatable relative to one another.

The extruder of the present invention is particularly useful in a method for the heat plastification of a heat plastifiable extrudable material, the method comprising providing a centrifugal extruder, the centrifugal extruder comprising a generally hollow discoidal rotor, the hollow discoidal rotor defining a material receiving cavity, a plurality of peripherally disposed extrusion openings, the extrusion openings being in full communication with the material receiving cavity, the material receiving cavity having a generally double tapered cross-sectional configuration when the cross-section is taken in a plane containing the axis of rotation, the cavity having a maximum dimension adjacent the axis of rotation in a direction normal to the plane of rotation of the rotor and a minimum dimension in a direction normal to the plane of rotation of the rotor at a location remote from the axis of rotation, a shear means disposed within the material receiving cavity, the shear means being a generally planar shearing element adapted to rotate coaxially relative to the housing and having peripheral portions which approximate the diameter of the material receiving cavity, the shearing element being in spaced relationship to a surface of the housing defining the cavity and the extrusion orifices, means to rotate the rotor and means to rotate the shearing element in a like direction, the rotor and the shearing element being also rotated relative to one another disposing the material within the material receiving cavity, rotating the rotor at a centrifugal extrusion speed, rotating the shearing element in a like direction, rotating the shearing element and the rotor relative to one another to provide sufficient mechanical shearing to heat plastify the heat plastifiable extrudable material sufficiently to be discharged from the extrusion orifices of the rotor.

Figure 1:
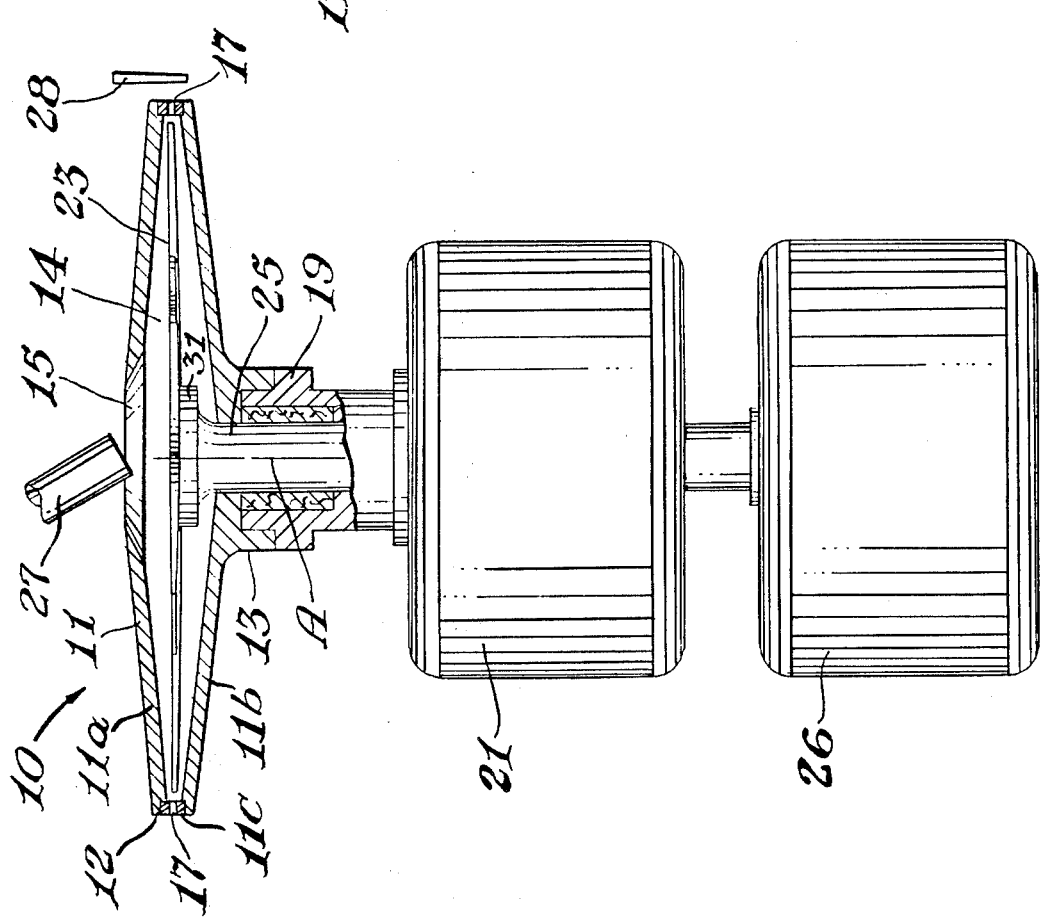

Further features and advantages of the present invention will become more apparent when the following specification taken in connection with the drawing wherein FIG. 1 is a schematic partly-in-section view of an apparatus in accordance with the present invention.

FIG. 2 is a schematic illustration of the shape of the material receiving opening and the shearing element within the centrifugal die of FIG. 1.

In FIG. 1 there is schematically depicted a partly-in-section view of an apparatus in accordance with the present invention generally designated by the reference numeral 10. The apparatus 10 comprises in cooperative combination a generally discoidal rotor 11, the discoidal rotor 11 comprises a first or upper portion 11a, a second or lower portion 11b and a peripheral portion ring 11c and has a periphery 12 and a generally centrally locating driving means or hub 13. The rotor 11 has defined herein a material receiving cavity 14. The cavity 14 has a generally discoidal configuration and communicates with space external to the rotor 11 by means of a material receiving port or opening 15 and a plurality of peripherally opposed orifices 17. The orifices 17 provide full communication between space external to the rotor 11 and the cavity 14. The cavity 14 is of an outwardly tapering configuration, that is, the cavity narrows in a radial direction away from the axis of rotation. The rotor 11 is supported on a rotating means or hollow shaft 19. The shaft 19 in turn is driven by a motor such as a motor 21 such as an electric motor, the motor 21 being capable of rotating the rotor 11 at a speed sufficient to centrifugally discharge heat plastified material from the material receiving cavity 14. Disposed within the cavity 14 is a shearing element 23. The shearing element 23 has a generally planar configuration in a plane normal to the axis of rotation $a$. The shearing element has maximum dimension which approximates the internal dimension of the cavity 14. Beneficially for the processing of heat plastifiable material such as synthetic resinous extrudable thermoplastic material the shearing element 23, at a location adjacent die orifices is spaced from a wall of the rotor 11 defining the cavity 14 by distances of from about 0.030 to about 0.150 inch. The shearing element 23 is supported upon the rotatable shaft 25 which passes through the rotor 11 in the region of the hub 13 and a location remote from the material receiving opening 15. The shaft 25 is coaxial with the hollow shaft 19 and is connected to a second drive means or electric motor 26. A material supply means or feed chute 27 is disposed adjacent the material receiving openings 15 and is adapted to supply material to the material receiving cavity 14. A cutting means such as a blade 28 is disposed adjacent the periphery of the rotor 11 and is attached to contact and sever strands extruded from the orifices 17.

In FIG. 2 there is shown a view of the rotor 11 with the upper portion 11a removed showing the configuration of the shearing element 23. The shearing element 23 is of generally planar configuration and has six arms 29 radially projecting from the axis of rotation. As viewed in FIG. 2, the six equally spaced arms 29 project from a hub 31 which in turn is affixed to the shaft 25. The arms 29, when viewed from the direction of the axis of rotation are of generally constant width; when viewed in the plane of rotation as depicted in FIG. 1 are of outwardly tapering cross-sectional configuration.

Generally in operation of an apparatus such as that in FIG. 1, the rotor 11 of the centrifugal extruder 10 is rotated at extrusion speed by the motor 21. The speed of the motors 21 and 26 is adjusted to provide a desired differential speed between the rotor 11 and the shearing element 23. Particulate material is provided from the feed chute 27. The particulate material supplied to the feed chute 27 must, of course, be heat plastifiable and extrudable. This material is moved by contact with the rotor 11 and the shearing element 23 and is thrown by centrifugal force to a location within the cavity generally adjacent the periphery 12. As the shearing element 23 defines a plurality of spaces between the arms, the particles are free to move and uniformly distribute themselves on either side of the shearing element 23. As they move radially outwardly in the cavity 14, the distance between the shearing element and the cavity wall decreases, the particles are subjected to mechanical shear and thereby softened. As additional material is added to the cavity, material near the periphery is forced outwardly and the shear induced by the relative rotation of the shearing element and the rotor provides sufficient heat to plastify the material. As the centrifugal force is maximized at the periphery of the rotor, the material which is heat plastified is rapidy forced out of the extrusion orifices 17 after having a minimal heat history.

Although the apparatus as depicted in FIG. 1 is particularly desirable for experimental purposes, once the optimum differential speed for a material has been determined desirable the relative rotational rate between the shearing element and the rotor may be obtained by replacing the motor 26 with an appropriate gear train or brake.

By way of further illustration, an apparatus generally as depicted in FIGS. 1 and 2 is used to heat plastify a vinylidene chloride polymer which is a polymer of about 85 parts by weight of vinylidene chloride and 15 parts by weight vinyl chloride using a 20 inch outside diameter titanium die and die ring. The rotor is rotated at 3600 rpm and the shearing element rotated at a speed of about 3560 rpm. Adequate heat is generated to heat plastify and extrude the material. Usually in order to minimize difficulties in starting such an extruder, it is oftentimes desirable to preheat the rotor adjacent the periphery, prior to the addition of polymer either with gas flame or electrical heaters to a temperature approximating the heat plastification of the polymer being processed. The rotor and shearing element are then brought up to speed and the particulate polymeric material added. In most cases air flowing over the rotor will maintain it at an acceptable temperature, however, if the polymer is to be subjected to minimum heat history a water spray or other fluid coolant may be directed on the rotor.

As is apparent from the foregoing specification, the present invention is susceptible of being embodied with various alterations and modifications which may differ particularly from those that have been described in the preceding specifications and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim:

1. A centrifugal extruder adapted to receive particulate heat plastifiable material, heat plastify and discharge the material in heat plastified form, the centrifugal extruder comprising
   a generally hollow discoidal rotor, the hollow discoidal rotor defining
   a material receiving opening in communication with
   a generally discoidal material receiving cavity,
   a plurality of peripherally disposed extrusion openings, the extrusion openings being in full communication with the material receiving cavity, the material receiving cavity having a generally double tapered cross-sectional configuration when the cross-section is taken in a plane containing the axis of rotation, the cavity having a maximum dimension adjacent the axis of rotation in a direction normal to the plane of rotation of the rotor and a minimum dimension in a direction normal to the plane of rotation of the rotor at a location remote from the axis of rotation,
   a shear means disposed within the material receiving cavity, the shear means being a generally planar shearing element defining spaces to permit particles of heat plastifiable material to distribute themselves on either side of the shearing element, the shearing element being adapted to rotate coaxially relative to the housing and having peripheral portions which approximate the diameter of the material receiving cavity, the shearing element being in spaced relationship to a surface of the housing defining the cavity and the extrusion orifices, means operatively associated with the rotor to rotate the rotor and means operatively associated with the shearing element to rotate the shearing element in a like direction, the rotor and the shearing element being rotatable relative to one another to thereby apply shear to a particulate heat plastifiable material within the rotor, the shear causing the particulate material to become heat plastified and centrifugal force causing the heat plastified material to be discharged from the extrusion openings.

2. The extruder of claim 1 wherein the planar shearing element has a plurality of spaced apart arms.

3. The extruder of claim 2 wherein the arms are generally radially extending.

4. The extruder of claim 3 wherein the arms have a generally constant width in a plane rotation.

5. The extruder of claim 4 wherein the arms taper in a plane generally containing the axis of rotation.

6. The apparatus of claim 1 in cooperative combination with a means to supply heat plastifiable extrudable polymer composition.

* * * * *